United States Patent [19]

Kuriyama et al.

[11] Patent Number: 4,746,684

[45] Date of Patent: May 24, 1988

[54] POLYURETHANE DISPERSION AND EMULSION, SHEET-LIKE POROUS MATERIAL AND PRODUCTION PROCESS THEREOF

[75] Inventors: Katsumi Kuriyama, Koshigaya; Misao Ichihara, Matudo; Iwao Misaizu, Ageo; Masashi Kashimura, Tokyo, all of Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 49,338

[22] Filed: May 13, 1987

[30] Foreign Application Priority Data

May 21, 1986 [JP] Japan .................................. 61-114837
May 21, 1986 [JP] Japan .................................. 61-114838

[51] Int. Cl.$^4$ ............................................. C08G 18/14
[52] U.S. Cl. ............................................. 521/137; 524/1; 524/315; 524/364; 524/500; 524/590; 524/591; 525/458
[58] Field of Search .................... 521/137; 524/1, 315, 524/364, 500, 590, 591; 525/458

[56] References Cited

U.S. PATENT DOCUMENTS 4,086,193  4/1978  Reischl .............................. 521/137

*Primary Examiner*—Maurice J. Welsh
*Attorney, Agent, or Firm*—Oblon, Fisher, Spivak, McClelland & Maier

[57] ABSTRACT

A polyurethane dispersion contains (A) an organic solvent, (B) a polyurethane resin having a molecular weight of 20,000–500,000, and (C) fine particles obtained from an active-hydrogen containing polyfunctional compound, which contains functional groups having a molecular weight of 50 or smaller per functional group, and an organic polyisocyanate. The dispersion can be converted into an emulsion by emulsifying water therein. A sheet-like porous material is also obtained by impregnating and/or coating a base material with the emulsion, causing the thus-coated emulsion to gel and then drying the resultant base material. The dispersion has excellent stability. The emulsion can be gelatinized at a relatively high temperature in a rather short period time, thereby permitting efficient production of the sheet-like porous material. The sheet-like material has a very fine porous structure, is excellent in various properties and has superb water vapor transmission characteristics. It is useful as a raw material for various synthetic hides, namely, for clothing, shoes, waterproof cloths, tents, wall paper, flooring, filter media, filters for air conditioners, etc.

6 Claims, 4 Drawing Sheets

POLYURETHANE DISPERSION AND EMULSION, SHEET-LIKE POROUS MATERIAL AND PRODUCTION PROCESS THEREOF

BACKGROUND OF THE INVENTION (1) Field of the Invention

This invention relates to a polyurethane dispersion and emulsion as well as a sheet-like porous material and a production process thereof. More specifically, this invention is concerned with a polyurethane dispersion and emulsion, which allow to produce with high productivity a sheet-like porous material excellent in various properties such as mechanical properties and water vapor transmission characteristics. This invention also relates to such a sheet-like porous material and a process for producing the sheet-like porous material with high productivity.

(2) Description of the Prior Art

Numerous sheet-like porous polyurethane materials have been known to date. Various processes have conventionally been known for their production. These processes may be divided roughly into wet processes and dry processes.

Each of these two types of processes has both merits and demerits. From the standpoint of productivity, dry processes are superior. As such dry processes, there have been known those described, for example, in Japanese Patent Publication No. 4380/1973 published on Feb. 7, 1973 and assigned to Teijin Limited, Japanese Patent Publication No. 8742/1973 published on Mar. 17, 1973 and assigned to Teijin Limited, Japanese Patent Laid-Open No. 41063/1976 laid open on Apr. 6, 1976 and assigned to Teijin Cordley Limited, Japanese Patent Laid-Open No. 66961/1979 laid open on June 1, 1979 and assigned to Teijin Limited, and Japanese Patent Laid-Open No. 68498/1979 laid open on May 9, 1979 and assigned to Teijin Limited. These known processes can each provide sheet-like porous materials having excellent performance. In order to obtain products of excellent performance by these processes, it is indispensable to selectively evaporate an organic solvent and water, which are both contained in a polyurethane emulsion employed. A very stringent temperature control is therefore required for gelation and drying. Further, the gelation and drying step requires a relative long period of time, for example, 30 minutes to 1 hour, leading to a problem that the productivity is very low due to the gelation and drying step although the other steps can be performed continuously.

These known processes involve a still further problem that the preparation of a polyurethane emulsion is either impossible or difficult since a polyurethane dispersion employed for the preparation of the polyurethane emulsion has poor stability and is prone to gelation.

In order to improve the productivity, it has been strongly desired in the present field of art to enhance the stability of a polyurethane dispersion useful in the practice of such processes as described above and hence to develop a process which does not require stringent control of the temperature in the gelatinizing and drying step and like parameters and can complete the gelatinizing and drying step in 10 minutes, preferably, in several minutes.

SUMMARY OF THE INVENTION

An object of this invention is to provide a sheet-like porous material excellent in various properties such as mechanical properties and water vapor transmission characteristics.

Another object of this invention is to provide a polyurethane emulsion, which can provide the above sheet-like porous material with high productivity.

A further object of this invention is to provide a polyurethane dispersion suitable for the preparation of the above polyurethane emulsion.

A still further object of this invention is to provide a process for producing the above sheet-like porous material with high productivity.

In view of the above-described desire to the conventional processes, the present inventors have conducted an extensive investigation in order to enhance the stability of a polyurethane dispersion useful in the practice of the conventional processes and hence to develop a process which does not require the irksome selective evaporation of an organic solvent and water from a polyurethane emulsion in the gelatinizing and drying step, permits the completion of the entire gelatinizing and drying step in 10 minutes and moreover can provide a product of excellent quality. As a result, it has been found that the aforementioned drawbacks of the prior art processes can be solved and the above-described desire of the present field of art can be fully met when a polyurethane emulsion making use of a specific polyurethane dispersion is employed as the polyurethane emulsion for the conventional processes, leading to completion of this invention.

In one aspect of this invention, there is thus provided a polyurethane dispersion comprising;
(A) an organic solvent;
(B) a polyurethane resin having a molecular weight of 20,000–500,000; and
(C) fine particles obtained from an active-hydrogen containing polyfunctional compound, which contains functional groups having a molecular weight of 50 or smaller per functional group, and an organic polyisocyanate.

In another aspect of this invention, there is also provided a polyurethane emulsion comprising:
(A) an organic solvent;
(B) a polyurethane resin having a molecular weight of 20,000–500,000;
(C) fine particles obtained from an active-hydrogen containing polyfunctional compound, which contains functional groups having a molecular weight of 50 or smaller per functional group, and an organic polyisocyanate; and
(D) water emulsified in the organic solvent.

In a further aspect of this invention, there is also provided a sheet-like porous material with a porous layer of a polyurethane resin provided on a base material, wherein the porous layer is composed of (A) a polyurethane resin having a molecular weight of 20,000–500,000 and (B) fine particles obtained from an active-hydrogen containing polyfunctional compound, which contains functional groups having a molecular weight of 50 or smaller per functional group, and an organic polyisocyanate.

In a still further aspect of this invention, there is also provided a process for producing a sheet-like porous material by impregnating and/or coating a base material with an oil-in-water polyurethane emulsion, causing the thus-coated emulsion to gel and then drying the resultant base material, wherein the polyurethane emulsion comprises:

(A) an organic solvent;
(B) a polyurethane resin having a molecular weight of 20,000–500,000 and dissolved in the organic solvent (A);
(C) fine particles obtained from an active-hydrogen containing polyfunctional compound, which contains functional groups having a molecular weight of 50 or smaller per functional group, and an organic polyisocyanate, and dispersed in the organic solvent (A); and
(D) water emulsified in the organic solvent (A).

The sheet-like porous material of this invention, which has been obtained by using the polyurethane dispersion and emulsion of this invention in accordance with the process of this invention, has a very fine porous structure and is equipped with various excellent physical properties and superb water vapor transmission characteristics. It is hence useful as a raw material for various synthetic hides, namely, for clothing, shoes, waterproof cloths, tents, wall paper, flooring, filter media, filters for air conditioners, etc.

BRIEF DESCRIPTION OF THE DRAWINGS

The above and other objects, features and advantages of this invention will become apparent from the following description and the appended claims, taken in conjunction with the accompanying drawings, in which:

DETAILED DESCRIPTION OF THE INVENTION AND PREFERRED EMBODIMENTS

Figure 1:
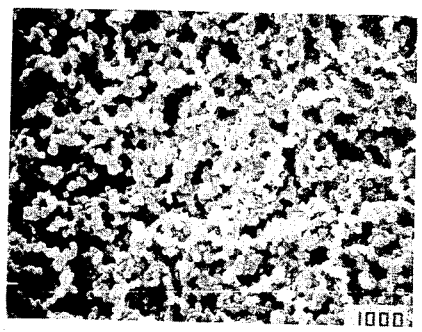
FIGS. 1–8 are photomicrographs of the shapes of fibers and the structures of particles in sheet-like porous materials according to this invention.

As described above, the present inventors have conducted an extensive investigation with a view toward providing a sheet-like porous material having a porous layer of good properties by solving the above-mentioned problems of the prior art, namely, the problems that the polyurethane dispersion employed has poor stability and the gelation and drying of the polyurethane emulsion must be conducted at a low temperature for a long period of time, in other words, by conducting the gelation and drying at a relatively high temperature, i.e., 100° C. or higher, preferably, 110° C.–200° C. for a short period of time. As a result, the following finding has been obtained. When a dispersion containing, in a solution of a polyurethane resin having a molecular weight in a specific range dissolved in an organic solvent, particular particles insoluble in the organic solvent, namely, fine particles obtained from an active-hydrogen containing polyfunctional compound containing functional groups having a molecular weight of 50 or lower per functional group and an organic polyisocyanate is used, a sheet-like porous material having such sufficient performance that its porous layer is neither deteriorated nor flattened by a gelatinizing and drying temperature considerably higher compared with those employed in the prior art can be obtained in a short period of time in spite of such a high temperature even if a polyurethane emulsion prepared from the polyurethane dispersion is gelatinized and dried at the high temperature after impregnation and/or coating of a base material with the polyurethane emulsion.

Such surprising effects seem to have been brought about, because the above-described specific fine particles contain numerous urea bonds and urethane bonds and have a high softening point and is hence not softened even at a high gelling and drying temperature and the specific fine particles can also gelatinize the co-existing polyurethane resin easily owing to the existence of many polar groups.

The polyurethane resin useful in the practice of this invention is a material known per se theoretically. It can be obtained by reacting a polyol, an organic polyisocyanate and a chain extender.

As exemplary polyols, may be mentioned polyethylene adipate, polyethylene propylene adipate, polyethylene butylene adipate, polydiethylene adipate, polybutylene adipate, polyethylene succinate, polybutylene succinate, polyethylene sebacate, polybutylene sebacate, polytetramethylene ether glycol, poly-ε-caprolactonediol, polyhexamethylene adipate, carbonate polyol, polypropylene glycol and the like, as well as those containing suitable proportions of polyoxyethylene chains in the above-described polyols. The exemplary polyols contain hydroxyl groups as terminal groups and their molecular weights range from 300 to 4,000.

Illustrative examples of the organic polyisocyanate may include 4,4'-diphenylmethane diisocyanate (MDI), hydrogenated MDI, isophorone diisocyanate, 1,3-xylylene diisocyanate, 1,4-xylylene diisocyanate, 2,4-tolylene diisocyanate, 2,6-tolylene diisocyanate, 1,5-naphthalene diisocyanate, m-phenylene diisocyanate, p-phenylene diisocyanate, etc. It is of course possible to use urethane prepolymers which are obtained by reacting these organic polyisocyanates with low molecular polyols or polyamines to form terminal isocyanate groups.

As exemplary chain extenders, may be mentioned ethylene glycol, propylene glycol, diethylene glycol, 1,4-butanediol, 1,6-hexanediol, ethylenediamine, 1,2-propylenediamine, trimethylenediamine, tetramethylenediamine, hexamethylenediamine, decamethylenediamine, isophoronediamine, m-xylylenediamine, hydrazine, water, and so on.

Polyurethane resins obtained from materials such as those mentioned above can all be used in the present invention with those having molecular weights of 20,000–500,000 being preferred and those having molecular weights of 20,000–250,000 being most preferred. Such polyurethane resins the molecular weights of which are 20,000–500,000, can be readily obtained by a preparation process and molecular weight modifying method which are both known conventionally. These polyurethane resins may be prepared either without any solvent or in an organic solvent. It is however advantageous from the standpoint of process steps to prepare it in an organic solvent to be employed upon formation of a polyurethane emulsion, namely, in an organic solvent having a certain degree of miscibility with water, because the reaction mixture can be used directly for the formation of a polyurethane emulsion.

As preferable examples of such an organic solvent, may be employed methyl ethyl ketone, methyl n-propyl ketone, methyl isobutyl ketone, diethyl ketone, methyl formate, ethyl formate, propyl formate, methyl acetate, ethyl acetate, butyl acetate, etc. It is also possible to use acetone, cyclohexane, tetrahydrofuran, dioxane, methanol, ethanol, isopropyl alcohol, butanol, toluene, xylene, dimethylformamide, dimethylsulfoxide, perchloroethylene, trichloroethylene, methylcellosolve, butylcellosolve, cellosolve acetate, and the like. Among these organic solvents, those having unlimited miscibility with water or those having no solubility in water should be used as mixtures with other organic solvents so that certain limitations are imposed on their miscibility with water. Needless to say, the above organic solvents may also be used as mixed organic solvents.

A polyurethane resin can be obtained in the form of a solution by preparing the polyurethane resin in such an organic solvent. It is convenient to adjust the solid content of the reaction mixture to a range of about 5–60 wt. % by adding either the same or different solvent or by removing the solvent.

The principal feature of this invention resides in the combined use of the specific fine particles along with the above polyurethane resin having such a particular molecular weight as mentioned above so as to use a polyurethane dispersion having excellent stability upon production of a sheet-like porous material.

The above fine particles can be obtained by reacting an active-hydrogen containing polyfunctional compound which contains functional groups having a molecular weight of 50 or smaller per functional group, for example, an active-hydrogen containing polyfunctional compound selected from the above-described chain extenders and the like and satisfying the above-mentioned conditions with such an organic polyisocyanate as mentioned above. As active-hydrogen containing polyfunctional compounds other than the above-described chain extenders, active-hydrogen containing polyfunctional compounds such as monoethanolamine, diethanolamine, triethanolamine, diethylenetriamine, diethylenetetramine, tetraethylenepentamine, glycerin, trimethylolpropane and pentaerythritol are useful by way of example.

Active-hydrogen containing polyfunctional compounds, each of which contains functional groups having a molecular weight greater than 50 per functional group, are not preferable for the objects of this invention, because the resulting fine particles have greater solubility in organic solvents and/or reduced heat resistance.

Fine particles such as those mentioned above can be easily obtained by reacting the above-described active-hydrogen containing polyfunctional compound and organic polyisocyanate at a desired ratio, preferably, in proportions close to their respective equivalents in an organic solvent. Since such fine particles are generally insoluble in an organic solvent, they are allowed to deposit in the reaction mixture at the same time as their formation and are hence obtained as minute particles. A dispersion of such fine particles in an organic solvent may be used as is. As an alternative, the fine particles may be used after their separation from the solvent. It is the most preferred embodiment to form fine particles by reacting an active-hydrogen containing polyfunctional compound and an organic polyisocyanate in a solution of a polyurethane resin having a molecular weight of 20,000–250,000 such as that described above.

The thus-obtained polyurethane dispersion shows far superior stability to conventional polyurethane dispersions. When fine particles are formed in a solution of a polyurethane resin in the aforementioned manner, the polyurethane resin is of course allowed to undergo chain extension and its molecular weight increases, for example, to 30,000–500,000 or so. However, no particular problem arises. Since the resulting fine particles are of course insoluble in an organic solvent, the reaction mixture is obtained as a fine dispersion.

Here, it is important that the molecular weight of the polyurethane resin in the solution falls within a range of 20,000–500,000, preferably, 20,000–250,000. In other words, any molecular weights smaller than 20,000 are not preferred because the reactivity between the polyurethane resin and the above-mentioned active-hydrogen containing polyfunctional compound and/or organic polyisocyanate becomes excessively high and the selective formation of fine particles becomes insufficient, whereby the reaction mixture is gelatinized, the resulting fine particles are hardly allowed to deposit and the heat resistance of the reaction product is lowered. If the molecular weight of the polyurethane resin exceeds 500,000 on the other hand, the viscosity of the resultant polyurethane resin solution may become so high that the uniform formation of fine particles is prevented in some instances.

The above problems will not arise so long as fine particles are prepared separately and then mixed with a solution of a polyurethane resin. Such a process is still encompassed by the present invention but is not fully advantageous from the standpoint of process steps. It is therefore preferable, as described above, to form fine particles in a solution of a polyurethane resin so that a polyurethane dispersion is provided.

No particular limitation is imposed on the particle size of the fine particles. In general, about 0.01–5 $\mu$m is preferred.

The ratio of the polyurethane resin having the molecular weight of 20,000–500,000 to the fine particles is also important. If the proportion of the fine particles is too small, it will be impossible to achieve the principal advantage of this invention, namely, it will be difficult to conduct the gelation and drying of the impregnated and/or coated layer of the polyurethane emulsion at a relatively high temperature of 100° C. or higher and the resulting porous layer will be flattened, thereby failing to form a highly porous layer. If the fine particles are used in an excessively large proportion on the other hand, no problem will arise with respect to the gelation and drying at such a high temperature but another problem will arise as to the physical strength of the resultant porous layer. It is hence not preferable to use the fine particles in any proportions outside the above-described range.

The preferable proportion of the fine particles is therefore 30–300 parts by weight per 100 parts by weight of the polyurethane resin. Within this range, a porous layer having sufficient performance can be formed at a high temperature in a short period of time.

The density of the above, so-called polyurethane dispersion may preferably be about 5–60 wt. % or so in terms of solids.

Such a polyurethane dispersion as described above, which is useful in the practice of this invention, is excellent in stability and facilitates the preparation of a polyurethane emulsion, as opposed to prior art polyurethane dispersions which were susceptible to gelation and inferior in stability and were hence either useless or hardly usable upon preparation of a polyurethane emulsion.

A polyurethane emulsion useful in the practice of this invention can be obtained by adding a suitable amount of an oil-in-water type emulsifier to the above-described polyurethane dispersion as needed and then adding water in an amount not greater than the saturation point, for example, in an amount of about 50–500 parts by weight per 100 parts by weight of the solid content of the dispersion while vigorously agitating the dispersion.

As the emulsifier, conventionally-known oil-in-water type emulsifiers are all usable. Of these, polyurethane-type surfactants containing polyoxyethylene chains in appropriate proportions in their molecules are particularly preferred. The emulsifier may preferably be used in a proportion of about 1–10 parts by weight per 100 solid parts by weight of the polyurethane resin dispersion.

The thus-obtained polyurethane emulsion is a creamy fluid of a milky white color. It will remain stable even when it is left over for several months as is. Such a polyurethane emulsion may be added optionally with various additives, for example, conventionally-known additives such as colorant, crosslinking agent, stabilizer and filler as needed.

As base materials useful in the present invention, any base materials may be used including, for example, various woven fabrics, knitted fabrics, non-woven fabrics, mold release paper sheets, plastic films, metal plates, glass plates, etc. The above polyurethane emulsion may be applied onto such base materials by any one of conventionally-known methods, for example, a coating method, a dipping method, or a combined coating-dipping method. The amount of the polyurethane emulsion to be impregnated and/or coated may vary within a wide range such as about 5–2,000 g formulation per m² depending what end use will be made on the resulting product.

In the process of this invention, the drying step can be completed in a very short period of time without need for any cumbersome processing. Since the drying step is the productivity-determining step in the dry process as in the process of this invention, such a fast drying step has led to extremely advantageous effects compared with the conventional processes. Namely, the intended final product, i.e., a sheet-like porous material of this invention can be obtained by simply drying an impregnated and/or coated base material for about 1–10 minutes at a temperature of about 100° C. or higher, preferably, 110° C.–200° C. without need for any coagulation step such as that described in Japanese Patent Laid-Open No. 41063/1976. The completion of the drying step in such a short period of time has been materialized probably for the following reasons. Namely, the aforementioned fine particles employed in this invention contain numerous urea bonds and urethane bonds and are hence highly cohesive, and moreover have a high softening point. As soon as the organic solvent begins to evaporate owing to the heating applied subsequent to the coating of the polyurethane emulsion, the polyurethane resin dissolved around the fine particles is probably caused to deposit and gel. Furthermore, the resultant porous structure is perhaps retained stably owing to the high softening point of the fine particles even during the subsequent high-temperature heating and drying step.

The sheet-like porous material of this invention, which has been obtained by using the polyurethane dispersion and emulsion of this invention in accordance with the process of this invention, has a very fine porous structure and is equipped with various excellent physical properties and superb water vapor transmission characteristics. It is hence useful as a raw material for various synthetic hides, namely, for clothing, shoes, waterproof cloths, tents, wall paper, flooring, filter media, filters for air conditioners, etc.

Conventional gelatinizing and drying temperatures was unable to materialize any continuous production of a sheet-like porous material. The process of this invention has however made it possible to produce such a sheet-like porous material continuously, because the gelation and drying of the polyurethane emulsion is performed stably at a far higher temperature compared with the prior art and the porous layer is hence formed in a very short period of time. Further, the prior art polyurethane dispersions employed for the preparation of polyurethane emulsions were prone to gelation and were unstable. Unlike the prior art polyurethane dispersions, the polyurethane dispersion of this invention is very stable and is thus excellent in workability and the like upon formation of a polyurethane emulsion.

The present invention will hereinafter be described by the following Examples and Comparative Examples, in which all designations of "part" and "parts" and "%" are by weight unless otherwise specifically indicated.

EXAMPLES 1–5

(1) Added to 3,183 parts of methyl ethyl ketone were 1,000 parts of 1,4-butaneethylene adipate (average molecular weight: about 1,000; hydroxyl number: 112), 31 parts of 1,4-butanediol and 333 parts of diphenylmethane diisocyanate. They were reacted at 70° C. for 8 hours to obtain a 30%-solid solution of a polyurethane resin having an average molecular weight of 65,000. The solution will hereinafter be called "the polyurethane resin solution (A)".

Then, 130 parts of ethylene glycol and 524 parts of diphenylmethane diisocyanate were added to the polyurethane resin solution (A). After reacting them at 60° C. for 10 hours, 1,526 parts of methyl ethyl ketone were added further to homogenize the reaction mixture. The reaction mixture was then allowed to cool down to room temperature under stirring, thereby obtaining a milky-white polyurethane dispersion in which the average molecular weight of the polyurethane was 126,000, the particle sizes of the deposited particles were not greater than 1 $\mu$m, and the solid content was 30%. The dispersion will hereinafter be called "the polyurethane dispersion (1)". The polyurethane dispersion (1) remained stable for at least 3 months at $-10°$ C.

(2) Added to 3,183 parts of methyl ethyl ketone were 1,000 parts of polytetramethylene glycol (average molecular weight: 1,000; hydroxyl number: 112), 24 parts of ethylene glycol and 340 parts of diphenylmethane diisocyanate. They were reacted at 70° C. for 9 hours to obtain a 30%-solid solution of a polyurethane resin having an average molecular weight of 52,000. The solution will hereinafter be called "the polyurethane resin solution (B)".

Then, 116 parts of ethylene glycol and 465 parts of diphenylmethane diisocyanate were added to the polyurethane resin solution (B). After reacting them at 60° C. for 10 hours, 1,356 parts of methyl ethyl ketone were added further to homogenize the reaction mixture. The reaction mixture was then allowed to cool down to room temperature under stirring, thereby obtaining a milky-white polyurethane dispersion in which the average molecular weight of the polyurethane was 103,000, the particle sizes of the deposited particles were not greater than 1 $\mu$m, and the solid content was 30%. The dispersion will hereinafter be called "the polyurethane dispersion (2)". The polyurethane dispersion (2) remained stable for at least 3 months at −10° C.

(3) Added to 5,416 parts of methyl ethyl ketone were 2,000 parts of 1,6-hexamethylene adipate (average molecular weight: 2,000; hydroxyl number: 56), 20 parts of 1,4-butanediol and 301 parts of diphenylmethane diisocyanate. They were reacted at 70° C. for 9 hours to obtain a 30%-solid solution of a polyurethane resin having an average molecular weight of 73,000.

Then, 390 parts of trimethylolpropane and 1,091 parts of diphenylmethane diisocyanate were added to the above resin solution. After reacting them at 60° C. for 10 hours, 3,456 parts of methyl ethyl ketone were added further to homogenize the reaction mixture. The reaction mixture was then allowed to cool down to room temperature under stirring, thereby obtaining a milky-white polyurethane dispersion in which the average molecular weight of the polyurethane was 178,000, the particle sizes of the deposited particles were not greater than 1 μm, and the solid content was 30%. The dispersion will hereinafter be called "the polyurethane dispersion (3)". The polyurethane dispersion (3) remained stable for at least 3 months at −10° C.

(4) To 4,547 parts of the polyurethane resin solution (A) of Example 1, 160 parts of triethanolamine and 403 parts of diphenylmethane diisocyanate were added. After reacting them at 40° C. for 8 hours, 1,314 parts of methyl ethyl ketone were added further to homogenize the reaction mixture. The reaction mixture was then allowed to cool down to room temperature under stirring, thereby obtaining a milky-white polyurethane dispersion in which the average molecular weight of the polyurethane was 146,000, the particle sizes of the deposited particles were not greater than 2 μm, and the solid content was 30%. The dispersion will hereinafter be called "the polyurethane dispersion (4)". The polyurethane dispersion (4) remained stable for at least 3 months at −10° C.

(5) To 4,547 parts of the polyurethane resin solution (B) of Example 2, 150 parts of glycerin and 611 parts of diphenylmethane diisocyanate were added. After reacting them at 50° C. for 12 hours, 1,776 parts of methyl ethyl ketone were added further to homogenize the reaction mixture. The reaction mixture was then allowed to cool down to room temperature under stirring, thereby obtaining a milky-white polyurethane dispersion in which the average molecular weight of the polyurethane was 167,000, the particle sizes of the deposited particles were not greater than 2 μm, and the solid content was 30%. The dispersion will hereinafter be called "the polyurethane dispersion (5)". The polyurethane dispersion (5) remained stable for at least 3 months at −10° C.

EXAMPLES 6-11

The dispersions of Examples 1-5 were separately agitated together with an emulsifier, organic solvents and water in a homomixer to prepare the following polyurethane emulsions.

(6) Polyurethane emulsion (1):

|  | Parts |
| --- | --- |
| Polyurethane dispersion (1) | 100 |
| Urethane-type emulsifier | 2 |
| Methyl ethyl ketone | 20 |
| Xylene | 20 |

-continued

|  | Parts |
| --- | --- |
| Water | 85 |

(7) Polyurethane emulsion (2):

|  | Parts |
| --- | --- |
| Polyurethane dispersion (2) | 100 |
| Urethane-type emulsifier | 2 |
| Methyl ethyl ketone | 20 |
| Toluene | 20 |
| Water | 80 |

(8) Polyurethane emulsion (3):

|  | Parts |
| --- | --- |
| Polyurethane dispersion (1) | 100 |
| Urethane-type emulsifier | 2 |
| Methyl ethyl ketone | 150 |
| Toluene | 20 |
| Water | 80 |

(9) Polyurethane emulsion (4):

|  | Parts |
| --- | --- |
| Polyurethane dispersion (3) | 100 |
| PO/EO block copolymer type emulsifier | 4 |
| Dioxane | 10 |
| Toluene | 10 |
| Xylene | 20 |
| Water | 70 |

(10) Polyurethane emulsion (5):

|  | Parts |
| --- | --- |
| Polyurethane dispersion (4) | 100 |
| Urethane-type emulsifier | 1 |
| Methyl isobutyl ketone | 20 |
| Toluene | 20 |
| Water | 75 |

(11) Polyurethane emulsion (6):

|  | Parts |
| --- | --- |
| Polyurethane dispersion (5) | 100 |
| PO/EO block copolymer type emulsifier | 1 |
| Tetrahydrofuran | 20 |
| Toluene | 20 |
| Water | 60 |

COMPARATIVE EXAMPLES 1-2

The polyurethane resin solutions (A) and (B) of Examples 1-2 were separately agitated together with an emulsifier, organic solvents and water in a homomixer to prepare the following polyurethane emulsions (A) and (B).

(1) Polyurethane emulsion (A):

|  | Parts |
| --- | --- |
| Polyurethane solution (A) | 100 |
| Urethane-type emulsifier | 2 |

-continued

| | Parts |
|---|---|
| Methyl ethyl ketone | 20 |
| Toluene | 20 |
| Water | 80 |

(2) Polyurethane emulsion (B):

| | Parts |
|---|---|
| Polyurethane dispersion (B) | 100 |
| Urethane-type emulsifier | 2 |
| Methyl ethyl ketone | 20 |
| Toluene | 20 |
| Water | 80 |

Properties of the above-described polyurethane emulsions (1)–(6), (A) and (B) are given below in Table 1.

TABLE 1

| Emulsion | Viscosity (25° C.) | Solid content |
|---|---|---|
| 1 | 23,000 (cps) | 14.1 (%) |
| 2 | 19,000 | 14.4 |
| 3 | 140 | 9.2 |
| 4 | 20,000 | 15.1 |
| 5 | 18,000 | 14.4 |
| 6 | 14,000 | 15.4 |
| A | 19,000 | 14.4 |
| B | 16,000 | 14.4 |

Note:
Stability . . . All the emulsions remained unchanged for at least 3 months.

EXAMPLES 12–18

Various base materials were separately impregnated and/or coated with the polyurethane emulsions (1)–(6) described above in Table 1 and then dried to obtain various kinds of sheet-like porous materials of this invention.

COMPARATIVE EXAMPLES 3–4

Various base materials were separately impregnated and/or coated with the polyurethane emulsions (A) and (B) described above in Table 1 and then dried to obtain various kinds of sheet-like porous materials.

TABLE 2

(Production Conditions)

| Example 12 | |
|---|---|
| Emulsion | (1) |
| Base material | Mold release paper |
| Coat (impregnated) weight | 200 g/m² (coated) |
| Drying conditions | 130° C. - 2 minutes |
| Example 13 | |
| Emulsion | (2) |
| Base material | Mold release paper |
| Coat (impregnated) weight | 200 g/m² (coated) |
| Drying conditions | 110° C. - 2 minutes |
| Example 14 | |
| Emulsion | (1) |
| Base material | Cotton cloth |
| Coat (impregnated) weight | 400 g/m² (coated) |
| Drying conditions | 140° C. - 3 minutes |
| Example 15 | |
| Emulsion | (4) |
| Base material | Nylon tuffeta |
| Coat (impregnated) weight | 200 g/m² (coated) |
| Drying conditions | 130° C. - 2 minutes |
| Example 16 | |
| Emulsion | (3) |
| Base material | Non-woven fabric |
| Coat (impregnated) weight | 1000 g/m² (coated) |

TABLE 2-continued (Production Conditions)

| | |
|---|---|
| Drying conditions | 120° C. - 5 minutes |
| Example 17 | |
| Emulsion | (5) |
| Base material | T/R raised fabric |
| Coat (impregnated) weight | 600 g/m² (coated) |
| Drying conditions | 120° C. - 4 minutes |
| Example 18 | |
| Emulsion | (5) |
| Base material | Polyester tuffeta |
| Coat (impregnated) weight | 200 g/m² (coated) |
| Drying conditions | 140° C. - 2 minutes |
| Comparative Example 3 | |
| Emulsion | (A) |
| Base material | Mold release paper |
| Coat (impregnated) weight | 200 g/m² (coated) |
| Drying conditions | 130° C. - 2 minutes |
| Comparative Example 4 | |
| Emulsion | (B) |
| Base material | Cotton cloth |
| Coat (impregnated) weight | 400 g/m² (coated) |
| Drying conditions | 140° C. - 2 minutes |

TABLE 3

(Properties of Sheets)

| | External appearance | I | II | III | IV |
|---|---|---|---|---|---|
| Example | | | | | |
| 12 | White | 0.486 | 59 | 8350 | Even & dense |
| 13 | White | 0.442 | 66 | 9150 | Even & dense |
| 14 | White | — | 110 | 8540 | Even & dense |
| 15 | White | — | 62 | 6920 | Even & dense |
| 16 | White | — | — | 5830 | Even & dense |
| 17 | White | — | 180 | 7120 | Even & dense |
| 18 | White | — | 60 | 8530 | Even & dense |
| Comp. Ex. | | | | | |
| 3 | Translucent | 1.102 | 26 | 160 | * |
| 4 | Translucent | — | 53 | 310 | * |

Note:
I . . . Apparent specific gravity (g/cm³)
II . . . Thickness of porous layer (μm)
III . . . Moisture permeability (g/m² · 24 hrs) (measured in accordance with JIS Z0208B)
IV . . . Internal porous structure
* . . . No porous layer was formed.

EXAMPLE 19

Figure 2:
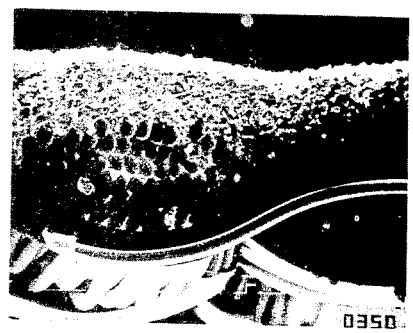
Figure 3:
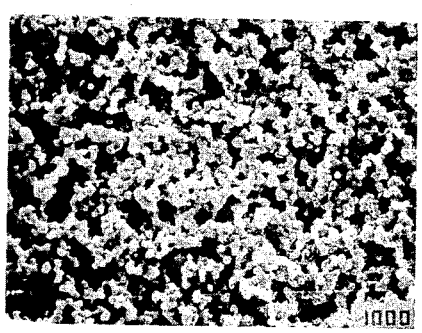
Figure 4:
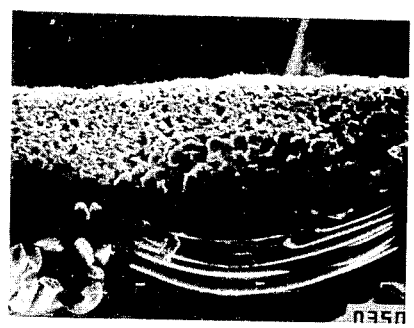
Figure 5:
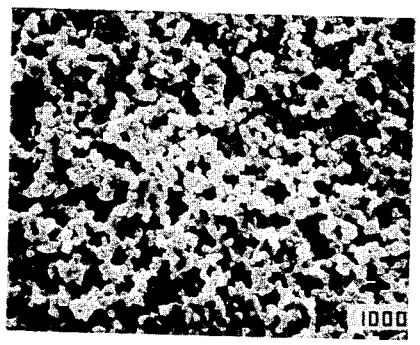
Figure 6:
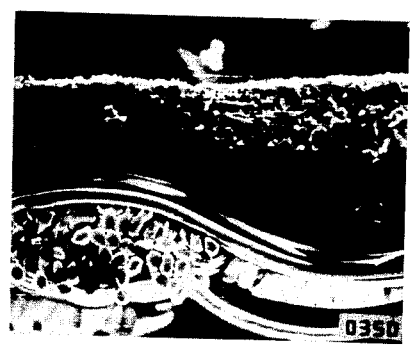
Figure 7:
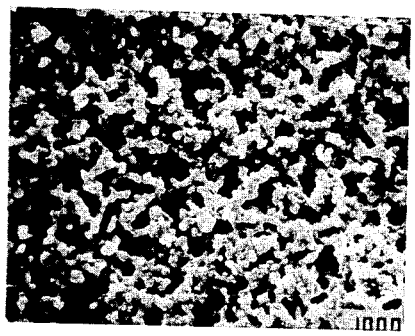
Figure 8:
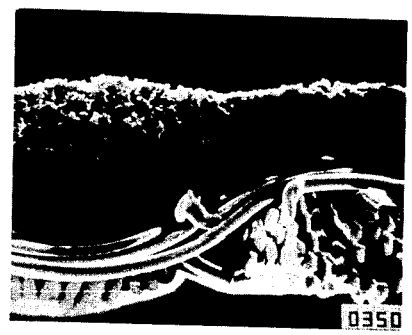

Four types of sheet-like porous sheets of this invention were separately obtained in the same manner as in Example 14 except that the drying temperature was set at 140° C., 160° C., 180° C. and 200° C. respectively. Their photomicrographs were taken. Their porous layers had sufficient porosity as shown in FIGS. 1–8.

COMPARATIVE EXAMPLE 5

Figure 9:
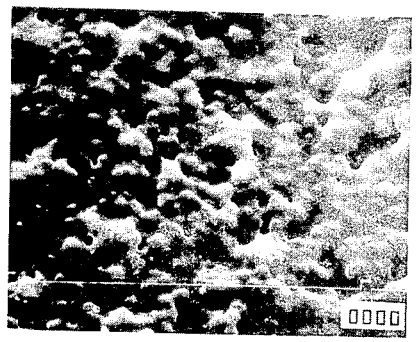
FIGS. 9–16 are photomicrographs of the shapes of fibers and the structures of particles in sheet-like porous materials of Comparative Examples.
Figure 10:
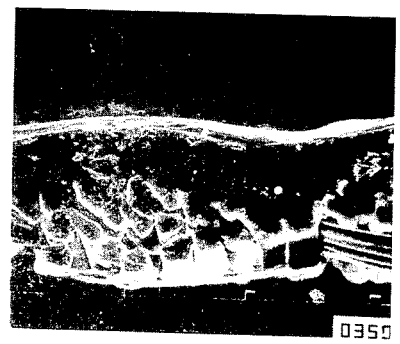
Figure 11:
Figure 12:
Figure 13:
Figure 14:
Figure 15:
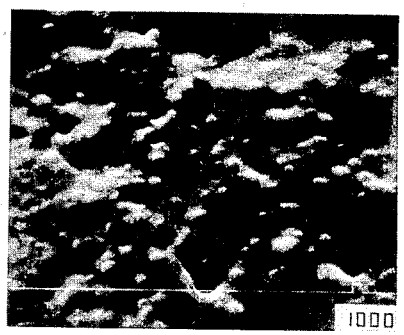
Figure 16:

Four types of sheet-like porous sheets of the present comparative example were separately obtained in the same manner as in Comparative Example 4 except that the drying temperature was set at 140° C., 160° C., 180° C. and 200° C. respectively. Their photomicrographs were taken. Their porous layers had lost their porosity substantially as shown in FIGS. 9–16.

COMPARATIVE EXAMPLE 6

Added to 3,064 parts of methyl ethyl ketone were 1,000 parts of polytetramethylene glycol (average molecular weight: about 1,000; hydroxyl number: 112), 24 parts of ethylene glycol and 289 parts of diphenylmethane diisocyanate. They were reacted at 70° C. for 9 hours to obtain a 30%-solid solution of a polyurethane resin having an average molecular weight of 6,000.

Then, 116 parts of ethylene glycol and 516 parts of diphenylmethane diisocyanate were added to the above resin solution. After reacting them at 60° C. for 10 hours, 1,475 parts of methyl ethyl ketone were added further to homogenize the reaction mixture. The reaction mixture was then allowed to cool down to room temperature under stirring, thereby obtaining a milky-white polyurethane dispersion in which the average molecular weight of the polyurethane was 123,000, the particle sizes of the deposited particles were not greater than 7 μm, and the solid content was 30%. The dispersion will hereinafter be called "the polyurethane dispersion (6)". The polyurethane dispersion (6) gelled 8 days later at −10° C.

COMPARATIVE EXAMPLE 7

Added to 3,197 parts of methyl ethyl ketone were 1,000 parts of polytetramethylene glycol (average molecular weight: about 1,000; hydroxyl number: 112), 24 parts of ethylene glycol and 346 parts of diphenylmethane diisocyanate. They were reacted at 70° C. for 9 hours to obtain a 30%-solid solution of a polyurethane resin having an average molecular weight of 312,000.

Then, 116 parts of ethylene glycol and 459 parts of diphenylmethane diisocyanate were added to the above resin solution. After reacting them at 60° C. for 10 hours, 1,342 parts of methyl ethyl ketone were added further to homogenize the reaction mixture. The reaction mixture was then allowed to cool down to room temperature under stirring, thereby obtaining a milky-white polyurethane dispersion in which the average molecular weight of the polyurethane was 597,000, the particle sizes of the deposited particles were not greater than 1 μm, and the solid content was 30%. The dispersion will hereinafter be called "the polyurethane dispersion (7)". The polyurethane dispersion (6) was a dispersion similar to a pudding-like jelly substance and it was impossible to perform the subsequent emulsification and coating or impregnation steps.

COMPARATIVE EXAMPLE 8 (Example of Japanese Patent Laid-Open No. 68498/1979)

A mixture of 585 parts of polybutylene adipate (molecular weight: 1,709), 311 parts of polytetramethylene ether glycol (molecular weight: 1,493), 126 parts of 2,2-bis[4-(β-hydroxyethoxy)phenyl]propane, 670 parts of diphenylmethane-4,4'-diisocyanate, 0.05 part of triethylenediamine (catalyst) and 411 parts of methyl ethyl ketone (solvent) was reacted at 50° C. for 80 minutes in a reaction vessel equipped with a stirrer to obtain a polyurethane prepolymer having an average molecular weight of 2,000 or lower.

Then, 156 parts of 1,4-butanediol and 3.2 parts of triethylenediamine (catalyst) were added to the thus-obtained prepolymer and they were reacted at 80° C. for 4 hours while adding dropwise 6,789 parts of methyl ethyl ketone.

The thus-obtained polyurethane dispersion (8) had a concentration of 20% and contained fine polyurethane particles the diameter of which were not greater than 10 μm. This dispersion gelled 1 day later at −10° C.

COMPARATIVE EXAMPLES 9-12

The dispersions of Comparative Examples 6 and 8 were separately agitated together with an emulsifier, organic solvents and water in a homomixer to prepare the following polyurethane emulsions.

(9) Polyurethane emulsion (C):

|  | Parts |
| --- | --- |
| Polyurethane dispersion (6) | 100 |
| Urethane-type emulsifier | 2 |
| Methyl ethyl ketone | 20 |
| Toluene | 20 |
| Water | 80 |

(10) Polyurethane emulsion (D):

|  | Parts |
| --- | --- |
| Polyurethane dispersion (6) | 100 |
| Urethane-type emulsifier | 2 |
| Methyl ethyl ketone | 20 |
| Toluene | 20 |
| Water | 38 |

(11) Polyurethane emulsion (E):

|  | Parts |
| --- | --- |
| Polyurethane dispersion (8) | 100 |
| Urethane-type emulsifier | 1.3 |
| Toluene | 13 |
| Water | 53 |

(12) Polyurethane emulsion (F):

|  | Parts |
| --- | --- |
| Polyurethane dispersion (8) | 100 |
| Urethane-type emulsifier | 1.3 |
| Toluene | 13 |
| Water | 25 |

EXAMPLES 20 & 21

(20) Polyurethane emulsion (7):

|  | Parts |
| --- | --- |
| Polyurethane dispersion (1) | 100 |
| Urethane-type emulsifier | 2 |
| Methyl ethyl ketone | 20 |
| Toluene | 20 |
| Water | 80 |

(21) Polyurethane emulsion (8):

|  | Parts |
| --- | --- |
| Polyurethane dispersion (1) | 100 |
| Urethane-type emulsifier | 2 |
| Methyl ethyl ketone | 50 |
| Toluene | 20 |
| Water | 38 |

Properties of the polyurethane emulsions (7) and (8) are shown below in Table 4.

TABLE 4

| Emulsion | Viscosity (25° C.) | Solid content |
|---|---|---|
| 7 | 18,000 (cps) | 14.4 (%) |
| 8 | 330 | 15.2 |
| C | 17,000 | 14.4 |
| D | 320 | 15.2 |
| E | 14,000 | 12.7 |
| F | 290 | 15.3 |

EXAMPLES 22–25

Various base materials were separately impregnated and/or coated with the polyurethane emulsions (7)–(8) described above in Table 4 and then dried to obtain various kinds of sheet-like porous materials of this invention.

COMPARATIVE EXAMPLES 13–20

Various base materials were separately impregnated and/or coated with the polyurethane emulsions (C) and (F) described above in Table 4 and then dried to obtain various kinds of sheet-like porous materials as the comparative examples.

TABLE 5

(Production Conditions)

Examples 22 & 23
| | |
|---|---|
| Emulsion | (7) |
| Base material | Nylon Taffeta |
| Coat (impregnated) weight | 700 g/m² |
| Drying conditions | 60° C. - 20 minutes (Example 22) |
| | 160° C. - 4 minutes (Example 23) |

Examples 24 & 25
| | |
|---|---|
| Emulsion | (8) |
| Base material | Nonwoven fabric |
| Coat (impregnated) weight | 1,800 g/m² |
| Drying conditions | 60° C. - 30 minutes (Example 24) |
| | 160° C. - 6 minutes (Example 25) |

Comparative Examples 13 & 14
| | |
|---|---|
| Emulsion | (C) |
| Base material | Nylon Taffeta |
| Coat (impregnated) weight | 700 g/m² |
| Drying conditions | 60° C. - 25 minutes (Comp. Ex. 13) |
| | 160° C. - 4 minutes (Comp. Ex. 14) |

Comparative Examples 15 & 16
| | |
|---|---|
| Emulsion | (D) |
| Base material | Nonwoven fabric |
| Coat (impregnated) weight | 1,800 g/m² |
| Drying conditions | 60° C. - 30 minutes (Comp. Ex. 15) |
| | 160° C. - 6 minutes (Comp. Ex. 16) |

Comparative Examples 17 & 18
| | |
|---|---|
| Emulsion | (E) |
| Base material | Nylon Taffeta |
| Coat (impregnated) weight | 700 g/m² |
| Drying conditions | 60° C. - 23 minutes (Comp. Ex. 17) |
| | 160° C. - 4 minutes (Comp. Ex. 18) |

Comparative Examples 19 & 20
| | |
|---|---|
| Emulsion | (F) |
| Base material | Nonwoven fabric |
| Coat (impregnated) weight | 1,800 g/m² |
| Drying conditions | 60° C. - 30 minutes (Comp. Ex. 19) |
| | 160° C. - 6 minutes (Comp. Ex. 20) |

TABLE 6

(Properties of Sheets and Stability of Dispersions Used)

| | I | II | III | IV | V | VI |
|---|---|---|---|---|---|---|
| Example | | | | | | |
| 22 | White | 118 | 6880 | | | |
| 23 | White | 121 | 6840 | | | |
| 24 | White | — | 6520 | | | |
| 25 | White | — | 6230 | | | |
| Comp. Ex. | | | | | | |
| 13 | White | 119 | 5170 | | | Δ |
| 14 | Less white | 76 | 2730 | Δ | Δ | Δ |
| 15 | White | — | 5050 | | | Δ |
| 16 | Less white | — | 2960 | Δ | Δ | Δ |
| 17 | Translucent | 68 | 1580 | X | Δ | X |
| 18 | Translucent | 54 | 310 | X | X | X |
| 19 | Translucent | — | 1920 | X | Δ | X |
| 20 | Translucent | — | 290 | X | X | X |

I . . . External appearance of each sheet.
II . . . Thickness of each porous layer (μm)
III . . . Moisture permeability (g/m² · 24 hrs) (Measured in accordance with JIS Z0208B)
IV . . . Internal porous structure:
 : Even and dense.
Δ: Porosity has been lost at some locations.
X: Uneven, and porosity had been lost at many locations, or no porous sheet was obtained.
V . . . Hand feeling:
 : Soft.
Δ: Slightly hard.
X: Hard.
VI . . . −10° C. stability of each dispersion employed:
 : Stable for at least 3 months.
Δ: Gelled eight days later.
X: Gelled one day later.

As demonstrated above, no differences were observed among Examples 22–25 in spite of the differences in drying conditions. The good sheet-like porous materials were obtained quickly by the high-temperature drying and the workability was extremely good. The internal porous structure was excellent in each of the examples like the preceding examples, as shown in the accompanying drawings. The stability of the dispersions employed in the invention examples was far superior of the stability of the dispersions used in the comparative examples.

In contrast, substantial differences were observed depending on the drying conditions in Comparative Examples 13–20. No sheet-like porous materials were obtained at a relatively high temperature and in a rather short period of time. The efficiency of the work was thus very poor. The dispersions employed in the comparative examples had poor stability and their long-term storage was thus impossible.

As has been described above, the present invention can provide a sheet-like porous material of excellent physical properties at a high gelling and drying temperature in an extremely short period of time.

Having now fully described the invention, it will be apparent to one of ordinary skill in the art that many changes and modifications can be made thereto without departing from the spirit or scope of the invention as set forth herein.

We claim:
1. A polyurethane dispersion comprising;
    (A) an organic solvent;
    (B) a polyurethane resin having a molecular weight of 20,000–500,000; and
    (C) fine particles obtained from an active-hydrogen containing polyfunctional compound, which contains functional groups having a molecular weight of 50 or smaller per functional group, and an organic polyisocyanate.

2. The polyurethane dispersion as claimed in claim 1, wherein the fine particles (C) have been formed in a solution of a polyurethane resin having a molecular weight of 20,000–250,000 in the organic solvent (A).

3. A polyurethane emulsion comprising:
(A) an organic solvent;
(B) a polyurethane resin having a molecular weight of 20,000–500,000;
(C) fine particles obtained from an active-hydrogen containing polyfunctional compound, which contains functional groups having a molecular weight of 50 or smaller per functional group, and an organic polyisocyanate; and
(D) water emulsified in the organic solvent.

4. A sheet-like porous material with a porous layer of a polyurethane resin provided on a base material, wherein the porous layer is composed of (A) a polyurethane resin having a molecular weight of 20,000–500,000 and (B) fine particles obtained from an active-hydrogen containing polyfunctional compound, which contains functional groups having a molecular weight of 50 or smaller per functional group, and an organic polyisocyanate.

5. A process for producing a sheet-like porous material by impregnating and/or coating a base material with an oil-in-water polyurethane emulsion, causing the thus-coated emulsion to gel and then drying the resultant base material, wherein the polyurethane emulsion comprises:
(A) an organic solvent;
(B) a polyurethane resin having a molecular weight of 20,000–500,000 and dissolved in the organic solvent (A);
(C) fine particles obtained from an active-hydrogen containing polyfunctional compound, which contains functional groups having a molecular weight of 50 or smaller per functional group, and an organic polyisocyanate, and dispersed in the organic solvent (A); and
(D) water emulsified in the organic solvent (A).

6. The sheet-like porous material as claimed in claim 5, wherein the particles (C) have been formed in a solution of a polyurethane resin having a molecular weight of 20,000–250,000 in the organic solvent (A).

* * * * *